United States Patent [19]

Wheeler et al.

[11] 4,067,014

[45] Jan. 3, 1978

[54] CORRELATION RECEIVER FOR DOPPLER MICROWAVE LANDING SYSTEM

[75] Inventors: Harold A. Wheeler, Smithtown; Alfred R. Lopez, Commack, both of N.Y.

[73] Assignee: Hazeltine Corporation, Greenlawn, N.Y.

[21] Appl. No.: 729,063

[22] Filed: Oct. 4, 1976

[51] Int. Cl.² ............................................. G01S 5/02
[52] U.S. Cl. ........................ 343/113 DE; 343/106 D; 364/487
[58] Field of Search ....... 343/112 R, 106 D, 113 DE; 235/151.31

[56] References Cited

U.S. PATENT DOCUMENTS

| 3,747,105 | 7/1973 | Payne ............................ 343/113 DE |
| 3,819,920 | 6/1974 | Goldfischer ....................... 235/181 |

Primary Examiner—Maynard R. Wilbur
Assistant Examiner—T. M. Blum

[57] ABSTRACT

A processing apparatus for determining the frequency of a supplied signal is usable in a Doppler microwave landing system. The apparatus derives scalar signals representative of signal frequency and amplitude and computes the average value of the scalar signals over a number of time intervals prior to dividing the signals to produce an output signal representative of average supplied signal frequency.

8 Claims, 9 Drawing Figures

CORRELATION RECEIVER FOR DOPPLER MICROWAVE LANDING SYSTEM

BACKGROUND OF THE INVENTION

This invention relates to doppler radionavigation systems, and in particular to the frequency measurement apparatus used in such systems.

Doppler navigation systems are characterized in the use of transmitters coupled with antennas which produce a radiation pattern in space wherein the frequency of radiation varies with a selected angular coordinate. Transmitting antenna systems of this type have been described in U.S. Pat. Nos. 3,864,679, 3,864,680 and 3,845,486.

FIG. 1 is an illustration of a doppler radionavigation system in accordance with the prior art of the type to which this invention is pertinent. In the system of FIG. 1 there is provided a linear array 20 of antenna elements 22a through 22m. A commutator 24 is associated with array 20 and is designed to sequentially supply signals provided at the commutator input 26 to the antenna elements 22. As a consequence of the operation of commutator 24, when radio frequency signals are supplied to input 26 and commutator 24 is activated to sequentially connect input 26 to antenna elements 22a, 22b, etc., there appears to be a moving source of radiation along the antenna aperture formed by linear array 20. In the system illustrated in FIG. 1, commutator 24 is designed to alternatively provide signals in a first sequence starting with element 22a and ending with element 22m, or in a second sequence, starting with element 22m and ending with element 22a.

It should be recognized that antenna elements 22 may comprise columns of elements in a direction orthogonal to the array to provide radiation pattern shaping. Alternatively, other frequency coding antennas such as those described in U.S. Pat. Nos. 3,864,679 and 3,864,680 may be used in lieu of the commutated array 20.

Those familiar with this type of system will recognize that the sequential radiation from elements 22 appears to an observer in the radiation field of the antenna to be a source of radiation which is moving along the aperture of array 20. When commutator 24 is operated in its first sequence, the motion appears to be in the direction of the arrow indicated in FIG. 1 at a velocity V corresponding to the switching rate of commutator 24. When commutator 24 is operated in its second sequence the motion of the source is reversed.

According to well-known principles the moving source of radiation causes there to be an apparent frequency shift in the radiated pattern, which depends on the angular position of the observer with respect to linear array 20. The amount of frequency shift is proportional to the sign of the angle $\theta$ from the broadside axis 25 of array 20. In addition, the frequency variation of radiation with angle $\theta$ is reversed, when the apparent motion of the source of radiation is reversed, upon activation of the second sequence of commutator 24.

Array 20 may be used to provide angular position information in an aircraft microwave landing system. In such a system an aircraft receiving the radiation from array 20 may make a frequency measurement of the radiation and therefore determine its angular position with respect to array 20 and consequently with respect to a runway. By using two orthogonally positioned arrays, each similar to array 20, an aircraft may receive coded information to determine both azimuth and elevation position information with respect to a runway. An additional antenna equipped with a transponder may be used to determine range information, thereby providing a pilot with a complete set of positioning information.

In a microwave landing system the receiver which is to make a frequency measurement of the radiation from array 20 is located on the aircraft, which is naturally moving at a significant velocity with respect to array 20. The motion of the aircraft itself causes a frequency shift of which cannot easily be distinguished from the angular frequency variation $F_D$ of the radiated signal from antenna 20. In order to enable a measurement of aircraft angular position independent of aircraft velocity, a second antenna 28 is provided to radiate a reference signal, which when detected an aircraft has the same frequency shift as a result of aircraft motion, since the aircraft's relative velocity with respect to the two antennas is substantially the same. In order to prevent radiation interference between the signals radiated by antennas 20 and 28, each antenna radiates a slightly different radio frequency.

Reference antenna 28 is shown in FIG. 1 to be an array of antenna elements 30 which may be similar to elements 22 of array 20. A power divider is provided to supply wave energy from an input port to the various elements 30 in an amplitude and phase to cause antenna 28 to radiate a signal into the desired angular region of system operation. Elements 30 are therefore supplied with wave energy having amplitude and phase characteristics which result in the desired radiation pattern, including possible sidelobe suppression or pattern emphasis in a selected direction along a runway centerline.

The system shown in FIG. 1 includes an oscillator 32 which continuously operates at a carrier frequency $F_c$. The output of oscillator 32 is provided to the input power divider of reference antenna 28 and also to mixer 34. An additional oscillator 36 operates continuously at an offset frequency $F_o$, which is selected to be substantially less than carrier frequency $F_c$. The output of mixer 34 comprises wave energy signals at frequencies above and below the carrier frequency by the offset frequency of oscillator 36. After appropriate filtering by filters 38 and 40 the signals are supplied alternately to commutator 24 by switches 42 and 44. When commutator 24 is operating in its first sequence during a first time interval, switch 42 is closed and the commutator is supplied with wave energy signals at a frequency higher than the carrier frequency. When commutator 24 is operating in its second sequence during a second time interval, switch 44 is closed and signals are supplied to commutator 24 at a frequency which is below the carrier frequency by the offset frequency.

In sequential dual scan operation commutator 24 is operated in its first and second sequences during alternating time intervals, and the signal provided to commutator 24 is alternated between a signal above and below the frequency of the signal supplied to reference antenna 28. This may be achieved by the apparatus of FIG. 1, whereby the signals supplied to commutator 24 are alternated between signals at frequencies above and below a fixed carrier during time intervals of duration T, as shown in FIG. 5A, or may be achieved by alternately switching signal sources between commutator 24 and reference antenna 28, as shown in FIG. 5B. In both figures the reference antenna signal frequency is shown as a solid line and the commutator signal frequency is shown as a dotted line for any time interval. A transmission may contain typically twelve such time intervals and angle measurements are made using an average value of the received signal frequency over the transmission. This averaging process is called "multiscan averaging".

FIG. 3 illustrates the center frequency relation of the signals used in the FIG. 1 system. It will be recognized by those skilled in the art that the actual radiated signals will have a bandwidth which is significantly wider than the narrow spectrum line illustrated. The bandwidth is the result of the finite time duration of the transmitted signal. For simplicity only the center frequency of the spectrum of each signal is illustrated. Reference antenna 28 radiates the carrier frequency $F_C$. Array antenna 20 radiates during a first time interval a signal which has a frequency $F_C + F_O$. Because of the frequency space coding characteristics of array 20 an observer in space measures this frequency only if he is located on the broadside axis of array 20. This is indicated at $\theta = 0$ in FIG. 3. When an observer is at an angle $\theta_D$, he observes the radiation from array 20 at a frequency which is greater than $F_C + F_O$ by an amount $F_D$ corresponding to the space frequency coding of array 20. This is indicated by $F_C + F_O + F_D$ in FIG. 3. This frequency of radiation is offset from the reference antenna radiation by an amount $F_O + F_D$ which is called the angletone frequency and can be obtained in the receiver by detecting the beat frequency of the reference radiation and the array radiation.

When commutator 24 of array 20 is operated in its second sequential mode, during alternate time intervals, the signals supplied to the input of commutator 24 are at a frequency $F_C - F_O$. Because of the reverse sequence of radiation from antenna elements 22, the angular frequency coding of the radiation from array 20 is opposite the frequency coding during the first time interval and therefore the Doppler shift observed by a receiver at an angle $\theta_D$ is also opposite. On the left side of the spectrum diagram in FIG. 3 there are shown the received array signals observed at angle $\theta = 0$ and also at another angle $\theta_D$ corresponding to the signal illustrated for the first time interval and commutator sequence to the right of FIG. 3. It will be observed that the offset from the reference carrier frequency has the same magnitude, but opposite sense.

In practical operation of a microwave landing system antenna 20 radiates a series of transmissions. These transmissions are in alternating sequences of commutator 24 and at alternate frequencies above and below reference frequency $F_C$. The aircraft receiver 21 includes an RF stage 23 and detector 25 which detects the mixed signal of the reference carrier and the array signal both including a component $\delta F$ arising out of aircraft motion. The detector output is the difference or angletone frequency which corresponds to the offset frequency of oscillator 36 plus the Doppler shift frequency, which can be decoded into angular information in frequency measurement circuit 27. If there are a repeated number of transmissions alternating ones having opposite frequency offset and angular coding, the receiver can perform an averaging function to increase angular measurement accuracy. In a typical system the repetition of transmissions may be at a rate of 400 transmssions per second.

A recent report distributed by Massachusetts Institute of Technology, Lincoln Laboratory, and entitled "Doppler Azimuth Reference Errors with Out of Beam Multipath", by J. E. Evans and S. M. Sussman, dated June 30, 1976, indicated that a problem in Doppler navigation systems of the type described above could arise on account of multipath reflections from objects near a runway, such as aircraft hangars. FIG. 2 illustrates the conditions under which such a problem can arise. Array antenna 20 and reference antenna 28 are illustrated at the end of runway 60. As an aircraft 62 approaches the opposite end of runway 60 the signals radiated by antennas 20 and 28 may reach aircraft 62 by direct signal paths 66 and 68 and also by reflected signal paths 70 and 72, which are reflected from the wall of hangar 64. Under these conditions the motion of aircraft 62 with respect to antennas 20 and 28 is different than the motion of aircraft 62 with respect to hangar 64. The radiation reflected off hangar 64 is therefor received at aircraft 62 with a different Doppler shift frequency than the radiation coming directly from antennas 20 and 28. In addition, the radiation along path 70 from array antenna 20 to aircraft 62 originates at a different angle than the radiation along direct path 66. As a result this radiation has a different radiation frequency by reason of the angular variation in radiated frequency characteristic of antenna 20. FIGS. 4A and 4B illustrate the effect of the presence of the indirect or multipath radiation at the receiver in aircraft 62.

FIG. 4A illustrates the received center frequency of the signals which result from direct and multipath coded and reference signals during the first commutator sequence of antenna 20. The figure illustrates the detected angletone frequency. The signals which are received directly from coding antenna 20 and reference antenna 28 produce a detected signal with an angletone frequency at $F_O + F_D$. For reference purposes this signal $C_D R_D$ is illustrated with unity amplitude. The angletone signal $C_D R_M$ which is derived from the direct coded signal $C_D$ and the multipath reference signal $R_M$ is illustrated to have a magnitude $\rho$, which is the amplitude of the reflection coefficient of the multipath reference signal. This signal $C_D R_M$ is shifted in frequency from the direct signal $C_D R_D$ by an amount d which corresponds to the "scalloping frequency" or Doppler shift difference on account of the differential motion of aircraft 62 with respect to reference antenna 28 and hangar 64.

Two additional angletone signals have center frequencies which are additionally offset from the desired angletone frequency $C_D R_D$ because of the frequency coding characteristics of antenna 20. These additional signals result from the mixing of the multipath coded signal $C_M$ with the direct reference signal $R_D$ to produce an angletone signal $C_M R_D$ having an amplitude $\rho$, and from the mixing of the multipath coded signal $C_M$ with the multipath reference signal $R_M$ to produce an angletone signal $C_M R_M$ with an amplitude $\rho^2$. These signals are offset from the direct signal angletone $C_D R_D$ by an amount $K\theta_{sep}$, where $\theta_{sep}$ is the angular separation of aircraft 62 and hangar 64 when viewed from antenna 20. This angle is illustrated in FIG. 2; K is the angular frequency coding coefficient of antenna 20.

In a typical Doppler processing system the signals which result from the multipath coded signal $C_M$ do not produce a significant error in measurement of the desired angletone signal $C_D R_D$ because the additional frequency offset $K\theta_{sep}$ resulting from the angular frequency variation of radiation from antenna 20 generally places these signals outside of the passband of the tracking filter used in the angletone signal processor. The passband of this filter is illustrated with dotted lines in FIGS. 4A and 4B.

FIG. 4B illustrates the central frequencies of the received angletone signals during the second commutator sequence of antenna 20. During this sequence the reference signal frequency is above the coded signal frequency and therefore the relative position of the multipath error signals with respect to the desired angletone signals have been interchanged. As in the spectrum illustrated in FIG. 4A only the error signal resulting from the mixing of the direct coded signal with the multipath reference signal falls within the passband of the processor tracking filter.

The presence of the additional signal within the tracking filter passband may, under some circumstances, cause a significant error in the measurement of the angletone signal as pointed out by the Evans et al. report. In particular, when the scalloping frequency, resulting from the differential Doppler shift on account of the different relative motion of aircraft 62 with respect to antenna 20 and hanger 64, has a frequency which is one half the frequency of sequential transmissions of coding antenna 20, there occurs a significant build up of multipath errors having an amplitude of the reference multipath reflection coefficient $\rho$.

The copending application of Richard Frazita Ser. No. 729,064 filed Oct. 4, 1976 which is assigned to the same assignee as the present invention discloses a Doppler radionavigation system which uses an alternating phase reference antenna to eliminate first order frequency measurement errors resulting from reference signal multipaths.

It is an object of the present invention to provide a signal processing apparatus which eliminates higher order errors, which occur at subharmonics of the transmisson repetition frequency in such a Doppler radionavigation system.

It is a further object of the invention to provide new and improved methods of measuring the frequency of a supplied signal.

SUMMARY OF THE INVENTION

In accordance with the present invention there is provided a signal processing apparatus for providing an output signal representative of the frequency of a supplied signal comprising a series of pulses, each pulse occurring during a predetermined time interval.

In one embodiment there is provided a local oscillator and correlation means for developing a complex correlation signal representative of the amplitude and phase of the supplied signal with respect to the local oscillator signal. A first integrating means is responsive to the correlation signal and has a symmetrical frequency response characteristic to produce complex sum signals representative of the symmetrical integrals of the correlation signal during selected time periods, each comprising at least a portion of one of the predetermined time intervals. A second integrating means is also responsive to the correlation signal and has asymmetrical frequency response characteristics to produce complex difference signals representative of the asymmetrical integrals of the correlation signal during the selected time periods. Means are provided to develop a first scalar signal representative of the summation of amplitude weighted components of the difference signals over a predetermined number of the time intervals, and to develop a second scalar signal representative of the summation of the magnitude of the sum signals over the predetermined number of time intervals. Ratio means, responsive to the first and second scalar signals, are provided to develop an error signal representative of the average frequency deviation of the supplied signal from the local oscillator signal during the predetermined number of time intervals.

In another embodiment there is provided detector means, responsive to the supplied signal for providing an amplitude signal representative of the amplitude of the supplied signal. A function generator provides a weighting factor signal during at least a portion of each of the time intervals. Means are provided, responsive to the weighting factor signal and the amplitude signal, for providing a first scalar signal representative of the time integral of the product of the weighting factor signal and the amplitude signal during a predetermined number of the time intervals. A zero-detector, responsive to the supplied signal, provides a pulsed signal representative of the number of cycles in the supplied signal. Means are provided for accumulating during the predetermined number of time intervals the value of the product of the weighting factor signal and the amplitude signal on the occurrence of each pulse of the pulsed signal to provide a second scalar signal. A divider circuit divides the second scalar signal by the first scalar signal to provide an output signal representative of the average frequency of the supplied signal.

For a better understanding of the present invention, together with other and further objects thereof, reference is made to the following description, taken in conjunction with the accompanying drawings, and its scope will be pointed out in the appended claims.

DESCRIPTION OF THE PRIOR ART SIGNAL PROCESSING APPARATUS

Figure 1:
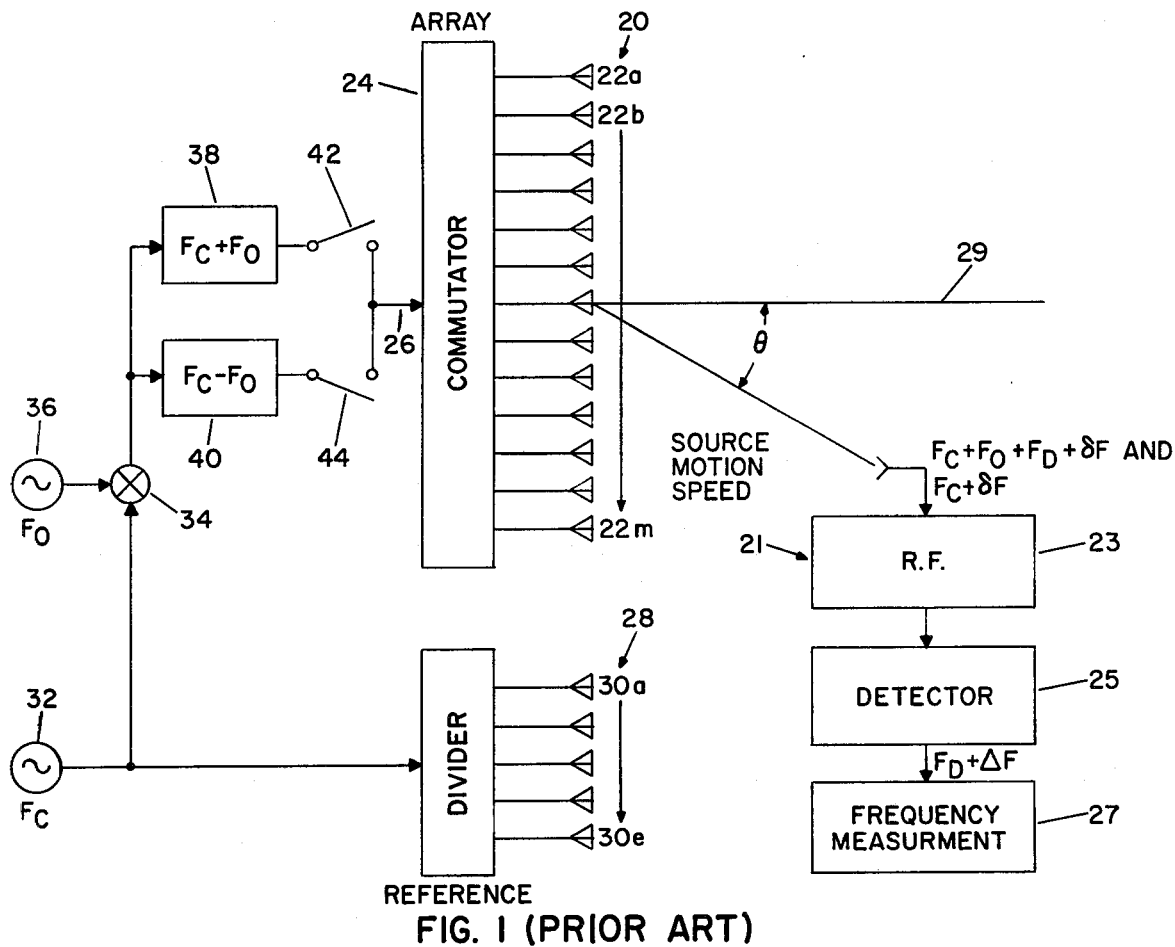
FIG. 1 is a schematic diagram showing a Doppler radionavigation system in accordance with the prior art.
Figure 2:
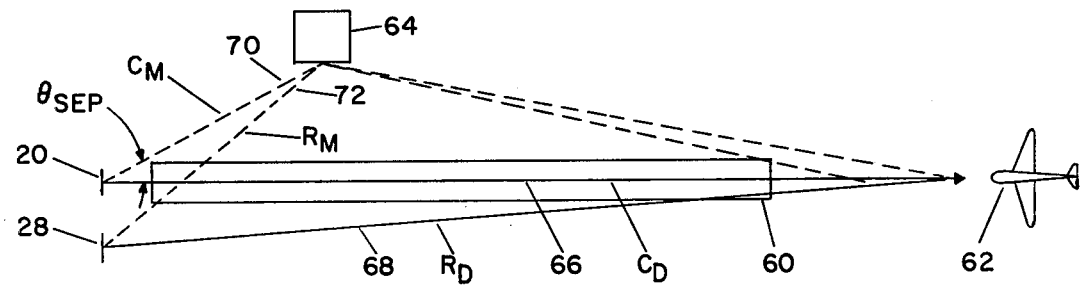
FIG. 2 illustrates an aircraft approaching a runway equipped with the system of FIG. 1, and having a nearby object causing a multipath interference signal.
Figure 5:
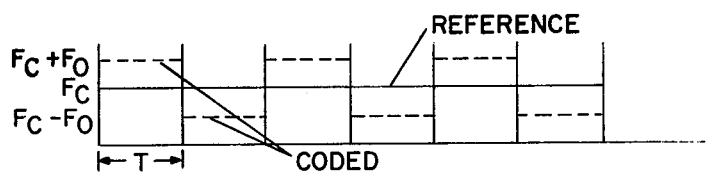
FIG. 5 illustrates the frequencies of signals supplied to antennas 20 and 28 during a number of time intervals in the radionavigation system of FIG. 1.
Figure 5:
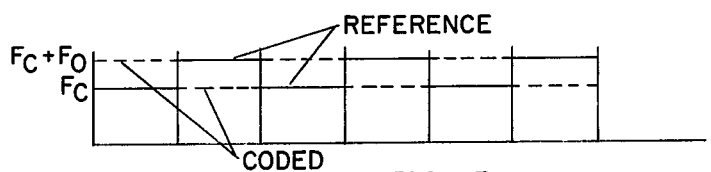
Figure 3:
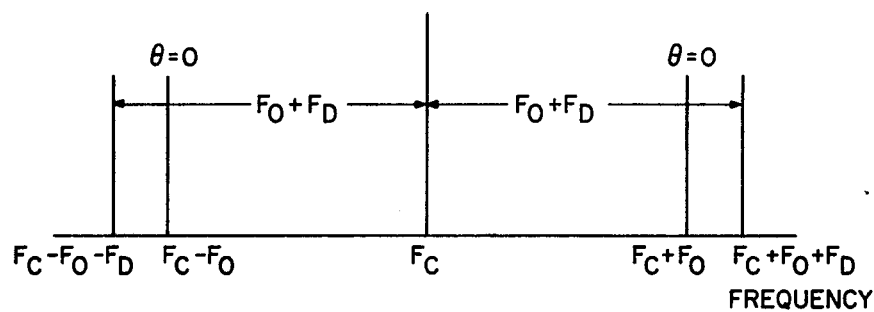
FIG. 3 is a spectral diagram of the signals radiated by the FIG. 1 system.
Figure 4A:
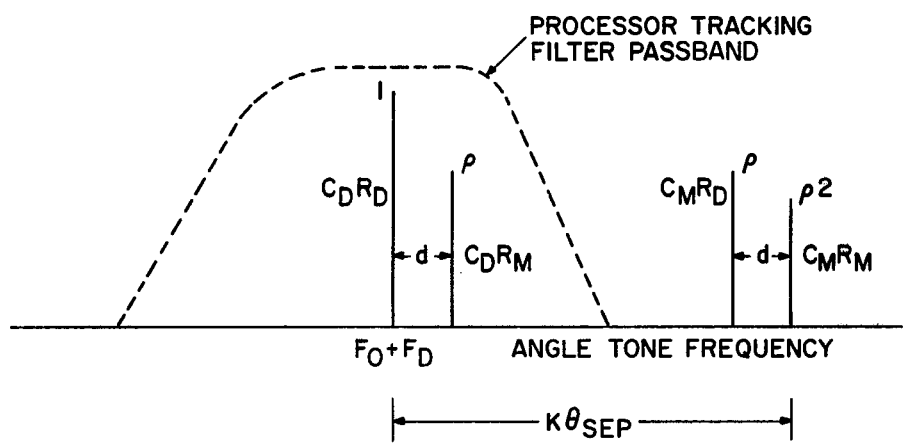
FIGS. 4A and 4B are spectral diagrams of the detected signal in the radionavigation system of FIG. 1, including multipath signals.
Figure 4B:
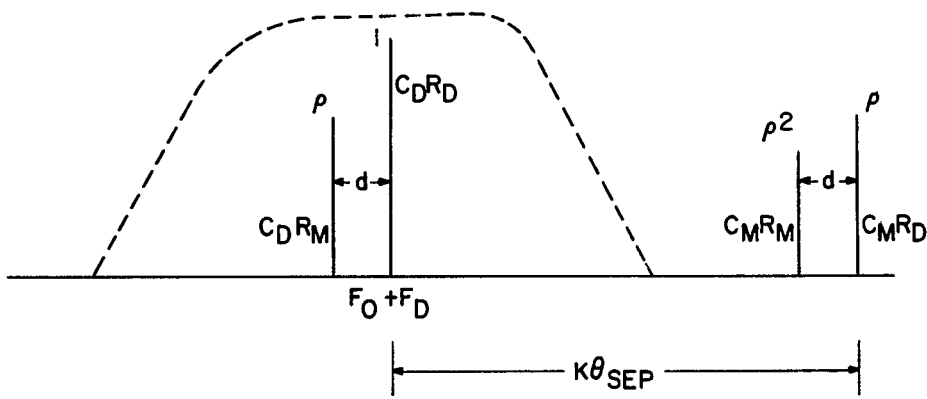
Figure 6:
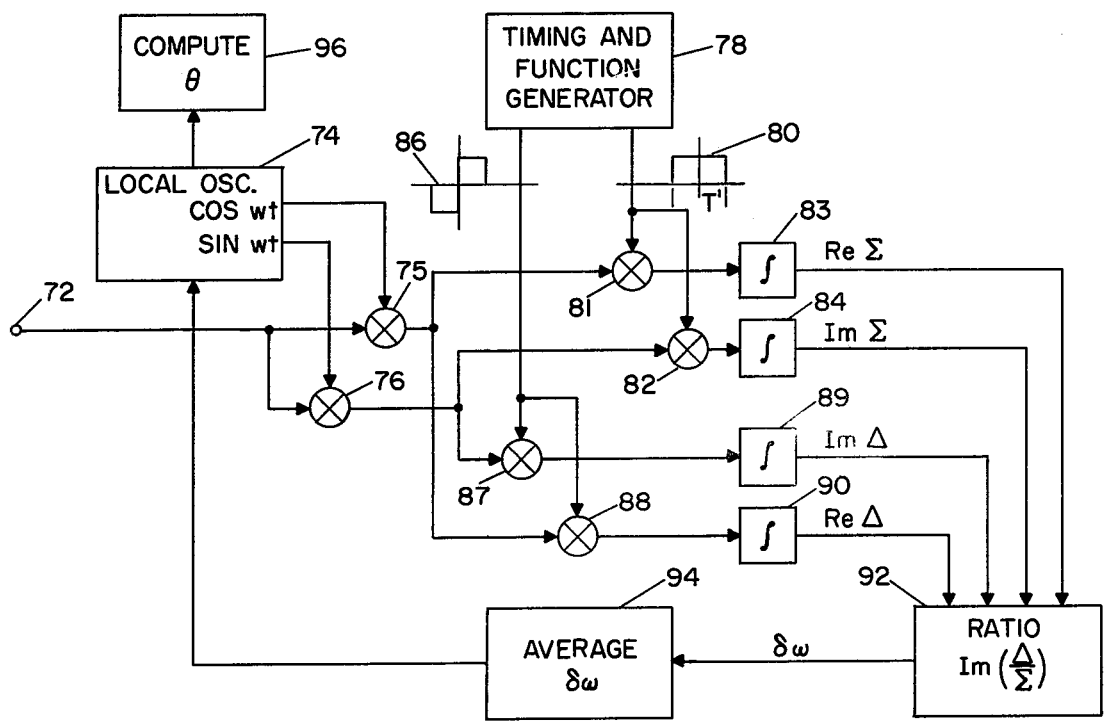
FIG. 6 is a schematic diagram of a signal processing apparatus in accordance with the prior art.

A correlation type signal processing apparatus in accordance with the prior art is shown in FIG. 6. The FIG. 6 signal processing apparatus is particularly useful in a receiver used in a Doppler radionavigation system of the type shown in FIG. 1. The apparatus shown in FIG. 6 corresponds to the frequency measurement circuit 27 of the FIG. 1 system. The detected angletone signal is supplied to input terminal 72 and coupled to mixers 75 and 76, which are also supplied with the real and imaginary components of the output of local oscillator 74. The mixer outputs comprise the real and imaginary components of the correlation signals derived from the supplied signal and the local oscillator signal. A timing and function generator 78 is provided, having output signals 80 and 86. Output signal 80 consists of a square-wave pulse with a duration T'. Pulse 80 is supplied in synchronism with the transmissions of the Doppler radionavigation system and its duration T' is less than the duration T of the system transmissions. Output 86 of timing and function generator 78 has the same magnitude and duration as output 80, but has a phase reversal at a time corresponding to the center of pulse 80. Those skilled in the art will recognize that output 80 is a symmetrical time pulse, while output 86 is an asymmetrical time pulse, and these pulses have corresponding symmetrical and asymmetrical frequency characteristics. Pulse 80 is supplied to mixers 81 and 82 whose output is integrated to provide real and imaginary components of a signal corresponding to the symmetrical time integration of the correlation signal. Asymmetrical signal 86 is supplied to mixers 87 and 88 whose integrated output comprises the real and imaginary components of the asymmetrical time integration of the correlation signal. The outputs of integrating filters 83, 84, 89, and 90 comprise the components of complex sum $\Sigma$ and difference $\Delta$ signals which are supplied to ratio circuit 92, which computes the imaginary part of the ratio of the asymmetrical integration signal, or difference signal $\Delta$, to the symmetrical integration or sum signal $\Sigma$. The output of ratio circuit 92 is a scalar error signal which upon multiplication by a suitable constant is representative of the frequency difference between the supplied signal and the signal from local oscillator 74. An averaging circuit 94 is provided to compute the average frequency error during a predetermined number of time intervals, which is then supplied to local oscillator 74 as a correction frequency signal. The actual angular position of the receiver, with respect to the system transmitting array, can be computed by circuit 96 using the corrected frequency of local oscillator 74.

The symmetrical integration signal $\Sigma$ may be expressed as follows:

$$\Sigma = [G_s(w - w_o) + \rho G_s(w - w_i) e^{j\phi}] e^{j\Psi}$$

where $G_s$ is the symmetrical integration filtering function.

$w$ is the angular phase rate of local oscillator 74

$w_o$ is the angular phase rate of the desired angletone signal resulting from signals $C_D$ and $R_D$ $w_i$ is the angular phase rate of the multipath angletone signal $C_D R_M$.

$\phi$ is the phase angle between signal components $C_D R_D$ and $C_D R_M$ and $\Psi$ is the arbitrary phase angle of the $C_D R_D$ signal with respect to the local oscillator signal.

The asymmetrical integration signal $\Delta$ is:

$$\Delta = [j G_d(w - w_o) + j \rho G_d(w - w_i) e^{j\phi}] e^{j\Psi}$$

where $G_d$ is the asymmetrical filtering function.

Assuming that local oscillator 74 is operating at the frequency of signal $C_D R_D$, $w = w_o$, an estimate of the multipath error may be made as follows:

$G_s(0) = 1$
$G_d(0) = 0$
for small values of $w - w_i$ $G_s(w - w_i) = 1$
$G_d(w - w_i) = w_o - w_i = w_p$
where $w_p$ is the "scalloping frequency"

Using these values there results:

$$\Sigma = (1 + \rho e^{j\phi}) e^{j\Psi}$$

$$\Delta = j w_p \rho e^{j\phi} e^{j\Psi}$$

The prior art correlation circuit of FIG. 6 computes the following "error" signal:

$$\epsilon = Im\left(\frac{\Delta}{\Sigma}\right) = Im\left[\frac{j w_p \rho e^{j\phi} e^{j\Psi}}{(1 + \rho e^{j\phi}) e^{j\Psi}}\right]$$
$$= w_p(\rho \cos \phi - \rho^2 \cos 2\phi + ...)$$

The term of this error signal, $w_p \rho \cos \phi$, is subject to elimination by averaging over several time intervals by circuit 94. The use of the reference antennas described in the above-identified copending application of Richard F. Frazita eliminates failure of averaging for scalloping frequencies less than the transmission repetition frequency.

The term $\rho^2 \cos 2\phi$ has a natural failure of averaging at scalloping frequencies of one-half the transmission repetition frequency, even with the reference phase reversal technique of the copending application. Higher order terms of the series have natural averaging failures at lower subharmonics of the transmission repetition frequency.

The processing apparatus of the present invention eliminates all such higher order error signals by taking a weighted average of scalar signals prior to taking a ratio.

ANALYSIS OF THE PROCESSING APPARATUS OF THE PRESENT INVENTION

In accordance with the present invention the processing apparatus is arranged to compute a first scalar signal:

$$Im (\Delta\Sigma^*) = j|\Sigma|^2 Im (\Delta/\Sigma) = j w_p(\rho e^{j\phi} + \rho^2)$$

The first scalar signal has two terms, both of which are subject to averaging over a series of time intervals. The $\rho e^{j\phi}$ term averages unless the scalloping frequency is equal to the transmission repetition frequency, provided phase reversal of the reference antenna signal $R_M$ is provided in accordance with the copending application.

The $\rho^2$ signal averages for all conditions, since the scalloping frequency term $w_p$ is negative for alternate time intervals by reason of the interchange of the coded signal frequency to values above and below the reference frequency.

The processing apparatus of the present invention computes a second scalar signal:

$$|\Sigma|^2 = \Sigma^*\Sigma = 1 + 2\rho \cos \phi + \rho^2$$

This second scalar signal is subject to similar averaging over multiple time intervals, with respect to the $2\rho \cos \phi$ term. Averaging is achieved by summing the signal over a number of time intervals. The remaining $1 + \rho^2$ term provides only a slight bias (which cancels if dual scan is used) when the "multiscan" average signals are divided to compute an error signal:

$$\delta w = \frac{\text{SUM } Im(\Delta \Sigma^*)}{\text{SUM } |\Sigma|^2}$$

No error occurs for $w = w_o$ condition, since the numerator of the error signal ratio approaches zero.

DESCRIPTION OF THE PREFERRED EMBODIMENT

Figure 7:
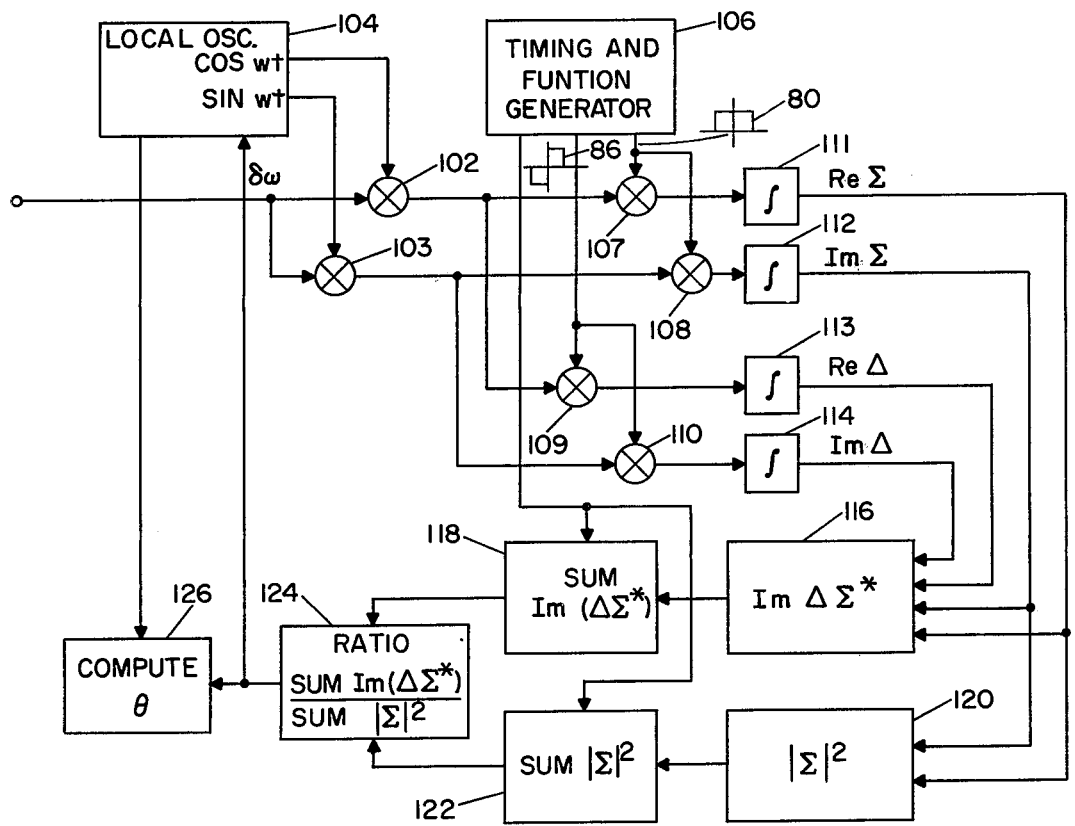
FIG. 7 is a schematic diagram of a correlation type signal processing apparatus in accordance with the present invention.

FIG. 7 illustrates one embodiment of a processing apparatus in accordance with the present invention. The FIG. 7 processing apparatus is of the "correlation" type, wherein the received angletone signal is supplied to a processor which compares the angletone signal to a signal supplied by a local oscillator whose frequency is an estimate of the expected angletone signal frequency.

The received angletone signal is supplied to processing input terminal 100 which is connected to the inputs of mixers 102 and 103. A local oscillator 104 has real and imaginary oscillation components which are supplied to mixers 102 and 103 respectively causing the mixers to generate the real and imaginery components of a correlation signal representative of the phase and amplitude of the received angletone signal with respect to the output signal of local oscillator 104. Timing and function generator 106 is provided and has symmetrical and asymmetrical output signals, similar to signals 80 and 86 of function generator 88, which are provided to mixers 107, 108, 109, and 110. Mixers 107 and 108 in combination with low-pass filters 111 and 112 comprise a first integrating means and generates the real and imaginary components of a sum signal $\Sigma$ which represents the symmetrical integration of the correlation signal during a selected time period, which is a portion of the time interval of the coded antenna transmissions. Likewise, mixers 109 and 110, in combination with low-pass filters 113 and 114 comprise a second integrating means and generates the real and imaginary components of a difference signal $\Delta$, which represents the asymmetrical integral of the correlation signal during the time period. Computing circuit 116 formulates a scalar signal, which is equal to the imaginary part of the integrated difference correlation signal $\Delta$ multipled by the conjugant of the sum correlation signal $\Sigma$. Timing signals from control circuit 106 are provided to computing circuit 116 so that the scalar output is provided to adding circuit 118 during each time interval of the transmitter. Adding circuit 118 forms the sum of the scalar difference signal during a predetermined number of transmitter time intervals.

A second scalar signal is formed by computing circuit 120 which computes the square of the absolute value of the sum correlation signal $\Sigma$. Accumulator 122 forms the sum of the second scalar signal over the predetermined number of time intervals in a manner similar to accumulator 118. At the end of a selected number of time intervals, the values in accumulators 118 and 122 are supplied to ratio circuit 124, which provides a signal representative of the ratio of the two sums formed in the accumulator circuits. This ratio, multiplied by a constant, is representative of the average frequency difference between the angletone signal and the local oscillator signal. This frequency difference signal may be supplied to local oscillator 104 to change the local oscillator frequency prior to the start of the next sequence of time intervals. The angular position of the aircraft on which the receiver is located may be determined by reading the frequency of local oscillator 104 after correction by the error signal, or may be determined by combining the error signal with the prior local oscillator frequency, and computing angular information from the known coefficient of angular frequency coding.

The diagram of FIG. 7 illustrates an analogue version of the processor of the present invention. Those skilled in such processors will recognize that all, or a portion of the processing apparatus such as computing circuits 116 through 124, may be implemented using well known digital techniques and components.

ALTERNATIVE EMBODIMENT ZERO CROSSING SIGNAL PROCESSOR

Figure 8:
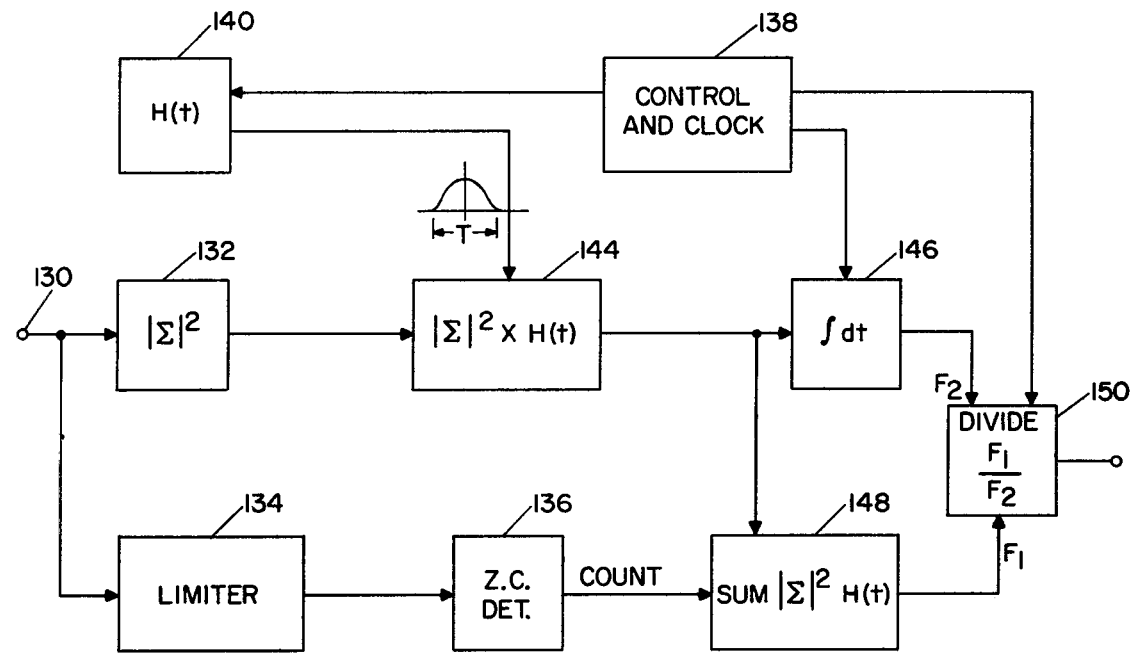
FIG. 8 is a schematic diagram of zero-crossing type signal processing apparatus in accordance with the present invention.

FIG. 8 illustrates the application of the present invention to a signal processing apparatus which operates in the time domain only, rather than the time and amplitude domain. The processor of FIG. 8 is of the type usually referred to as a "zero-crossing" processor. Received angletone signals are supplied to input terminal 130. Detector 132 detects the amplitude of the received angletone frequency and forms an output signal representative of the absolute value of the supplied signal. The angletone signal is also provided to limiter 134 which facilitates the operation of zero crossing detector 136 by providing a signal of substantially uniform amplitude. The output of zero crossing detector 136 is in the form of narrow pulses, each of which occurs when the angletone signal has zero value. These pulses may be provided at each zero crossing of the supplied angletone signal, or alternately may be provided only during the positive or only during the negativegoing zero crossing.

Control circuit 138 activates function generator 140 which provides a time weighted signal during each time interval of the supplied signal. Control circuit 138 is synchronized to the system transmitter by techniques which are not germane to the present invention. The time weighted signal H(t) may have uniform amplitude during a portion of each time interval, but preferably is tapered to have less amplitude toward the beginning and end of the time interval such as curve 142 shown in FIG. 8. Circuit 144 is provided to multiply the value of the detected amplitude of the angletone signal by the weighting function H(t) to provide a multiplying factor. This multiplying factor is supplied to accumulating circuit 148 and integrating circuit 146. Accumulating circuit 148 forms a scalar signal $F_1$ by adding the value of the multiplying factor each time a count is received from zero crossing detector 136. This signal $F_1$ is formed over a selected number of time intervals. The zero value of the weighting function H(t) at the beginning and end of each time interval prevents the accumulation of error from spurious zero crossings during the transition time from one time interval to the next.

Integrating circuit 146 may be identical to accumulator 148. As clock pulses are supplied from control and clock circuit 138, circuit 146 may perform a time integral of the multiplying factor by adding the value of the multiplying factor each time a clock pulse is received to form a scalar signal $F_2$. At the end of a selected number of time intervals, a control signal is provided by circuit 138 which causes dividing circuit 150 to read the values in circuits 146 and 148 and form their quotient $F_1/F_2$. The resulting output signal is directly proportional to the frequency of the angletone signal supplied at input terminal 130.

An analysis of the operation of the FIG. 8 circuit demonstrates the elimination of higher order components as follows:

The multipath signal causes a phase shift $\alpha$ in the angletone signal resulting in a frequency shift $\alpha'$ equal to:

$$\alpha' = \frac{d\alpha}{dt} = \frac{d\alpha}{d\phi} \frac{d\phi}{dt} = w_p \frac{\rho \cos \phi + \rho^2}{1 + 2\rho \cos \phi + \rho^2}$$
$$\alpha' = w_p(\rho \cos \phi - \rho^2 \cos 2\phi + \ldots)$$
As above $F_2 = |\Sigma|^2 = 1 + 2\rho \cos \phi + \rho^2$ Multiplying the $|\Sigma|^2$ factor by $\alpha'$ yields;

$$|\Sigma|^2 \alpha' = w_p(\rho \cos \phi + \rho^2)$$

This term, which is the multipath error included in scalar signal $F_1$ is similar to the Im $(\Delta\Sigma^*)$ signal, which, as noted above, reduces to zero by averaging over a number of time intervals.

While the signal processing apparatus of the present invention has been described with particular reference to Doppler radionavigation systems, those skilled in the art will recognize that the apparatus described is useful in any system which involves a determination of the average frequency of a signal comprising a series of pulses. It will also be recognized that the apparatus may be implemented in both analog or digital embodiments or a mixture of the two system types.

While there have been described what are believed to be the preferred embodiments of the invention, those skilled in the art will recognize that other and further modifications may be made without departing from the spirit of the invention and it is intended to claim all such embodiments as fall within the true scope of the invention.

We claim:

1. Signal processing apparatus, for providing an error signal representative of the average frequency difference between a local oscillator signal and a supplied signal comprising a series of transmissions, each transmission occurring during a predetermined time interval, comprising:
   correlation means, responsive to said supplied signal and said local oscillator signal, for developing a complex correlation signal representative of the amplitude and phase of said supplied signal with respect to said local oscillator signal;
   first integrating means, responsive to said correlation signal and having a symmetrical frequency response characteristic, for producing complex sum signals representative of the symmetrical integrals of said correlation signal during selected time periods, each comprising at least a portion of one of said predetermined time intervals;
   second integrating means, responsive to said correlation signal and having asymmetrical frequency response characteristics for producing complex difference signals representative of the asymmetrical integrals of said correlation signal during said selected time periods;
   means, responsive to said sum and difference signals, for developing a first scalar signal representative of the summation of amplitude weighted components of said difference signals over a predetermined number of said time intervals;
   means, responsive to said sum signals, for developing a second scalar signal representative of the summation of the magnitudes of said sum signals over said predetermined number of time intervals;
   ratio means, responsive to said first and second scalar signals, for developing said error signal, representative of the average frequency deviation of said supplied signal from said local oscillator signal during said predetermined number of time intervals.

2. Apparatus as specified in claim 1 wherein said means for developing said first scalar signal comprises means for developing a plurality of intermediate first scalar signals during each of said time intervals and means for adding said intermediate first scalar signals during said predetermined number of time intervals.

3. Apparatus as specified in claim 2 wherein said means for developing said intermediate first scalar signals comprises means for developing a signal representative of the imaginary component of the product of each of said difference signals and the conjugate of the corresponding sum signal.

4. Apparatus as specified in claim 1 wherein said means for developing said second scalar signal comprises means for developing a plurality of intermediate second scalar signals during each of said time intervals and means for adding said intermediate second scalar signals during said predetermined number of time intervals.

5. Apparatus as specified in claim 4 wherein said means for developing said intermediate second scalar signals comprises means for developing a signal representative of the absolute value of each of said sum signals.

6. Signal processing apparatus, for providing a signal representative of the average frequency of a supplied signal comprising a series of transmissions, each transmission occurring during a predetermined time interval, comprising:
   detector means, responsive to said supplied signal, for providing an amplitude signal representative of the amplitude of said supplied signal;
   a function generator for providing a weighting factor signal during at least a portion of each of said time intervals
   means, responsive to said weighting factor signal and said amplitude signal, for providing a first scalar signal representative of the time integral of the product of said weighting factor signal and said amplitude signal during a predetermined number of said time intervals;
   a zero crossing detector, responsive to said supplied signal for providing a pulsed signal representative of the number of cycles in said supplied signal;
   means for accumulating during said predetermined number of time intervals the value of the product of said weighting factor signal and said amplitude signal on the occurrence of each pulse of said pulsed signal to provide a second scalar signal;
   and a divider for dividing the second scalar signal by the first scalar signal to provide a signal representative of the average frequency of said supplied signal.

7. Signal processing apparatus as specified in claim 6 wherein said means for providing a first scalar signal comprises a clock having output clock pulses and an accumulator for adding the value of the product of said weighting factor signal and said amplitude signal on the occurrence of each of said clock pulses.

8. Signal processing apparatus as specified in claim 6 wherein said function generator comprises means for generating a symmetrically tapered amplitude signal during at least a portion of each of said time intervals.

* * * * *